United States Patent [19]
Hayasaka

[11] Patent Number: 6,166,473
[45] Date of Patent: Dec. 26, 2000

[54] DYNAMO-ELECTRIC MACHINE AND GENERATOR AND MOTOR WHEREIN THE MACHINE IS USED

[76] Inventor: Shigeaki Hayasaka, 6-35-411, Tsukunocho 1cho, Sakai-shi, Osaka 593, Japan

[21] Appl. No.: 09/142,070

[22] PCT Filed: Jan. 21, 1998

[86] PCT No.: PCT/JP98/00250

§ 371 Date: Aug. 31, 1998

§ 102(e) Date: Aug. 31, 1998

[87] PCT Pub. No.: WO98/33262

PCT Pub. Date: Jul. 30, 1998

[30] Foreign Application Priority Data

Jan. 24, 1997 [JP] Japan ................................. 9/25816

[51] Int. Cl.$^7$ .................................................. H02K 1/00
[52] U.S. Cl. ......................... 310/216; 310/114; 310/156; 310/261; 310/166
[58] Field of Search .................................. 310/112, 113, 310/211, 261, 156, 114, 166

[56] References Cited

U.S. PATENT DOCUMENTS 5,892,311  4/1999  Hayasaka ................................. 310/166

FOREIGN PATENT DOCUMENTS 57-160357  10/1982  Japan .
3-54358    5/1991   Japan .
7-123662   5/1995   Japan .

*Primary Examiner*—Nestor Ramirez
*Assistant Examiner*—Judson H. Jones
*Attorney, Agent, or Firm*—Jordan and Hamburg LLP

[57] ABSTRACT

A rotary electric apparatus functions as either a generator or a motor and has a rotary shaft defining an axial direction and a stator disposed around an external periphery of the rotary shaft. The stator has coil assemblies including coils wound around core members extending parallel to the axial direction and equidistantly disposed about the rotary shaft. The core members have opposing first and second stator pole surfaces normal to the axial direction and disposed respectively in opposing first and second sides of the stator. A first monopole rotor is fixed on the rotary shaft adjacent the first side of the stator and has all N-polar magnetic pole surfaces normal to the axial direction, disposed diametrically opposed about the rotary shaft, and alignable opposite the first stator pole surfaces during rotation of the first monopole rotor. A second monopole rotor is fixed on the rotary shaft adjacent the second side of the stator and has all S-polar magnetic pole surfaces normal to the axial direction, disposed diametrically opposed about the rotary shaft, and alignable opposite the second stator pole surfaces during rotation of the second monopole rotor. The S-polar magnetic pole surfaces are aligned opposing the N-polar magnetic pole surfaces with the stator therebetween. The stator has twice the number of core members as each of the first and second rotors respectively have N-polar magnetic pole surfaces and S-polar magnetic pole surfaces.

5 Claims, 9 Drawing Sheets

(1)

(2)

(3)

Inductive Electromotive Forces

DYNAMO-ELECTRIC MACHINE AND GENERATOR AND MOTOR WHEREIN THE MACHINE IS USED

BACKGROUND OF THE INVENTION

The present invention relates to a rotary electric apparatus having a structure which comprises a stator and a pair of rotors disposed at both-sides of the stator. And furthermore this invention relates to a generator and a motor respectively using the above rotary electric apparatus.

The applicant of the present invention had previously proposed a generator having a structure shown in FIGS. 12 and 13 as per the Laid-Open Japanese Patent Publication No. HEI-7-123662.

The generator comprises a pair of rotors 92N and 92S which are integrally secured onto a rotary shaft 90, spaced apart a certain distance, and a stator 91 disposed surrounding an external periphery of the rotors 92N and 92S.

The rotor 92N has N-polar magnetic poles 93a and 93b at diagonal positions of the external periphery. The other rotor 92S has S-polar magnetic poles 94a and 94b at diagonal positions of the external periphery. These magnetic poles are respectively formed outwardly.

The stator 91 has 4 cores 95a~95d disposed in a circle around external periphery of the rotors 92N and 92S wherein coils 96a~96d are respectively disposed at lengthwise center portions of the cores 95a~95d. Winding directions of the coils 96a~96d are arranged in such a manner in which, if the coils 96a and 96c disposed at diagonal positions were wound in the clockwise direction, then the coils 96b and 96d disposed at the other diagonal positions are wound in the counterclockwise direction.

When the rotors 92N and 92S are rotated by delivering rotating force to a rotary shaft 90 of the generator, as shown in FIG. 14 for example, sawtooth shaped inductive electromotive force V1 is generated from the coils 96a and 96c disposed at one of the diagonal positions, whereas similar inductive electromotive force V2 having lagged phase is generated from the coils 96b and 96d disposed at the other diagonal positions. By way of synthesizing inductive electromotive forces V1 and V2 generated in the coils 96a~96d, rectangular output power V is generated, and yet, by way of shaping waveform of the output power V, direct-current output power is generated.

Nevertheless, according to the structure of the above-referred generator, inasmuch as the rotors 92N and 92S are opposed to the stator 91 in diametric direction of the shaft 90, the cores 95a~95d of the stator 91, the magnetic poles 93a/93b of the rotor 92N and the poles 94a/94b of the rotor 92S are respectively formed with a curved surface. Thus much labor/time is needed for the manufacturing process, and magnetic fluxes from the magnetic poles 93a, 93b, 94a, and 94b are also unevenly distributed causing the generated output power V to be distorted, thus raising a problem.

In order to provide greater magnetic flux for the magnetic poles 93a, 93b, 94a, and 94b, it is essential that lengthy permanent magnets be used in the axial direction, but it in turn causes the size of the generator to be expanded further. Consequently, this results in an extended total length of the magnetic path resulting in iron loss and leakage flux increasing adversely affecting operating efficiency, thus raising a problem as well.

SUMMARY OF THE INVENTION

The present invention addresses solving the above problems. An object of the invention is to provide a compact rotary electric apparatus capable of fully solving the above problems affecting the manufacturing process and operating characteristic via introduction of a structure in which a pair of rotors are disposed at sides of a stator. It is also an object of the invention to provide a generator and a motor respectively using the rotary electric apparatus embodied by the invention.

The invention provides a rotary electric apparatus comprising a rotary shaft, a stator disposed surrounding an external periphery of the rotary shaft, and a pair of rotors integrally disposed onto the rotary shaft at both side positions of the stator. One of the rotors comprises a plurality of N-polar magnetic poles, whereas the other rotor comprises the same number of S-polar magnetic poles as said N-polar magnetic poles. The N and S magnetic poles of the rotors are respectively disposed at equal angles in a state opposed to each other in the axial direction across the stator.

Furthermore, the above stator comprises a certain number of cores that corresponds to double number of magnetic poles of each rotor, magnetic-pole portions formed at both ends of respective cores and coils wound on respective cores. The magnetic-pole portions at both ends of each core are disposed at equal angles opposed to the respective magnetic poles of the rotors via an air-gap.

According to the above structure, by virtue of provision of a pair of rotors at both side positions of the stator and arrangement of the magnetic poles of respective rotors opposed to respective magnetic-pole portions of the cores of the stator in the axial direction, the magnetic poles of respective rotors can be formed with flat surfaces, thus making it possible to readily even out magnetic flux. Further, inasmuch as the length of the stator is contracted in the axial direction, total length of the magnetic path is also contracted to result in the decreased iron loss and leakage flux.

The present invention further provides a generator using the rotary electric apparatus described above. In the generator, the coils of the stator generate sawtooth shaped inductive electromotive forces by rotation of the rotors when the shaft is driven by rotating force, and the inductive electromotive forces generated by respective coils are synthesized and to be delivered as generated output.

According to the generator based on the above structure, whenever rotating force is transmitted from an external source, sawtooth shaped inductive electromagnetic force is generated from respective coils of the stator. In this case, magnetic flux from the magnetic poles of respective rotors is evenly generated, inductive electromotive force from respective coils is not subject to distortion, thus making it possible to provide stable output power.

The present invention further provides a motor using the rotary electric apparatus descibed above. In the motor, the rotary shaft is rotated by repulsive force and attractive force which are simultaneously generated between the magnetic-pole portions at both ends of the cores on the stator and the magnetic poles of respective rotors, by flowing current through respective coils, with the direction of current being reversed alternately.

According to the motor based on the above structure, when flowing current through respective coils with reversing the direction of current alternately, repulsive force and attractive force are simultaneously generated between magnetic-pole portions at both ends of respective cores and respective magnetic poles of the rotors to enable the rotary shaft to be rotated. In this case, since magnetic flux from the magnetic poles of respective rotors is evenly held, the rotors can be rotated smoothly.

The present invention further provides a motor based on another aspect of the above structure, in which each magnetic-pole portion of the cores on the stator are so formed that both ends of the portion take different shapes to cause magnetic flux generated by said magnetic pole portion to distribute asymmetrically with respect to a center line thereof. Accordingly, distribution of magnetic flux generated by each magnetic-pole portion is asymmetrically effected with respect to a center line thereof, thus enabling the motor to effect self-activation at the start-up moment.

DETAILED DESCRIPTION OF THE INVENTION

Figure 1:
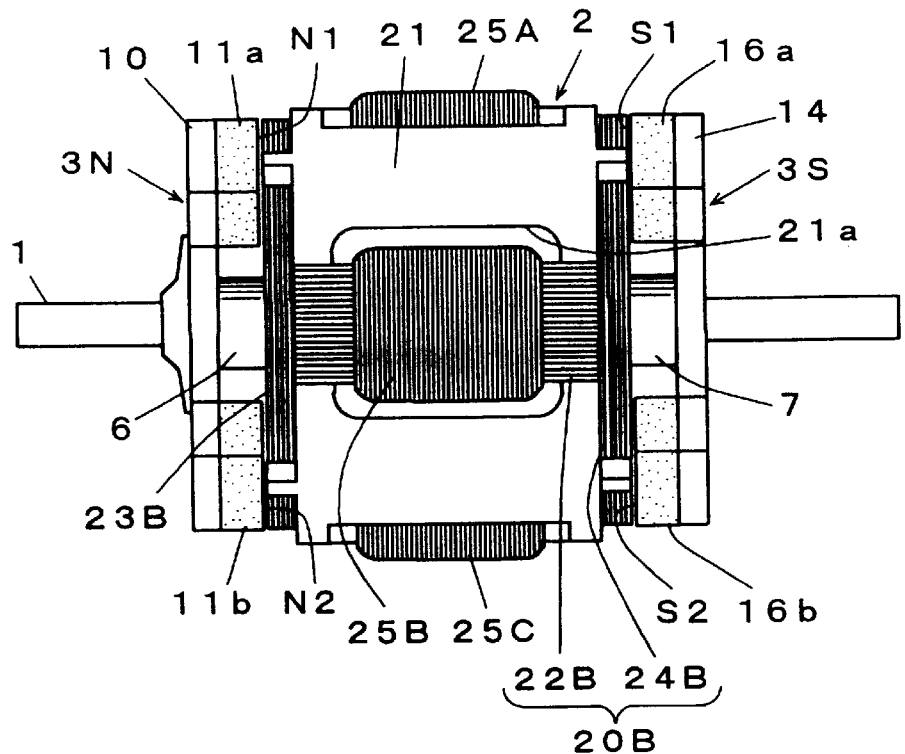
FIG. 1 is a front view showing a generator representing an embodiment the invention.
Figure 2:
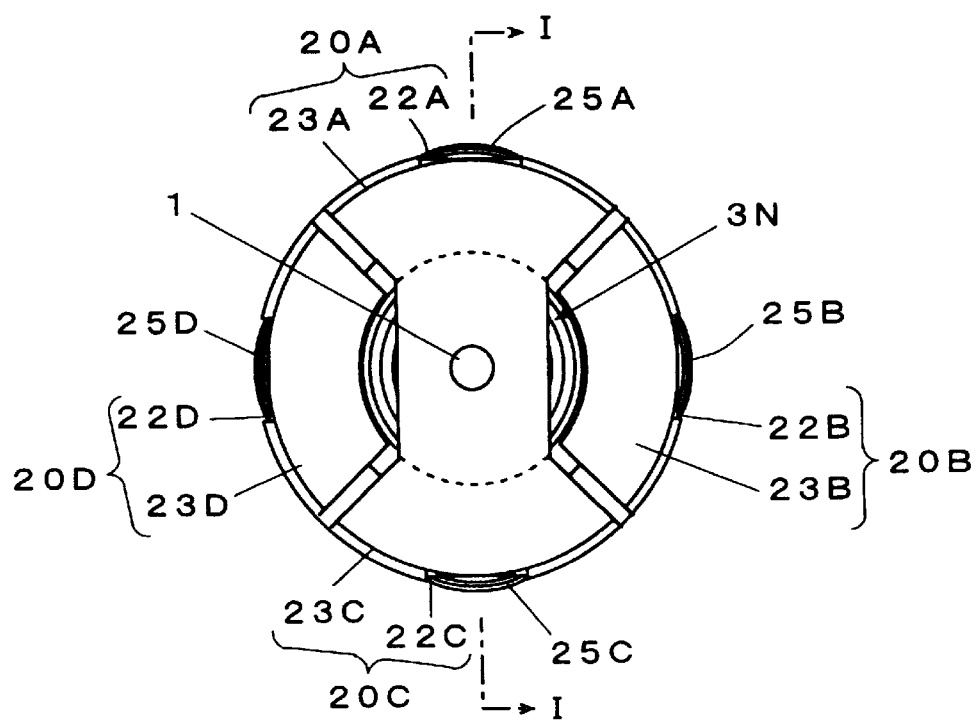
FIG. 2 is a lateral view showing the generator shown in FIG. 1.
Figure 3:
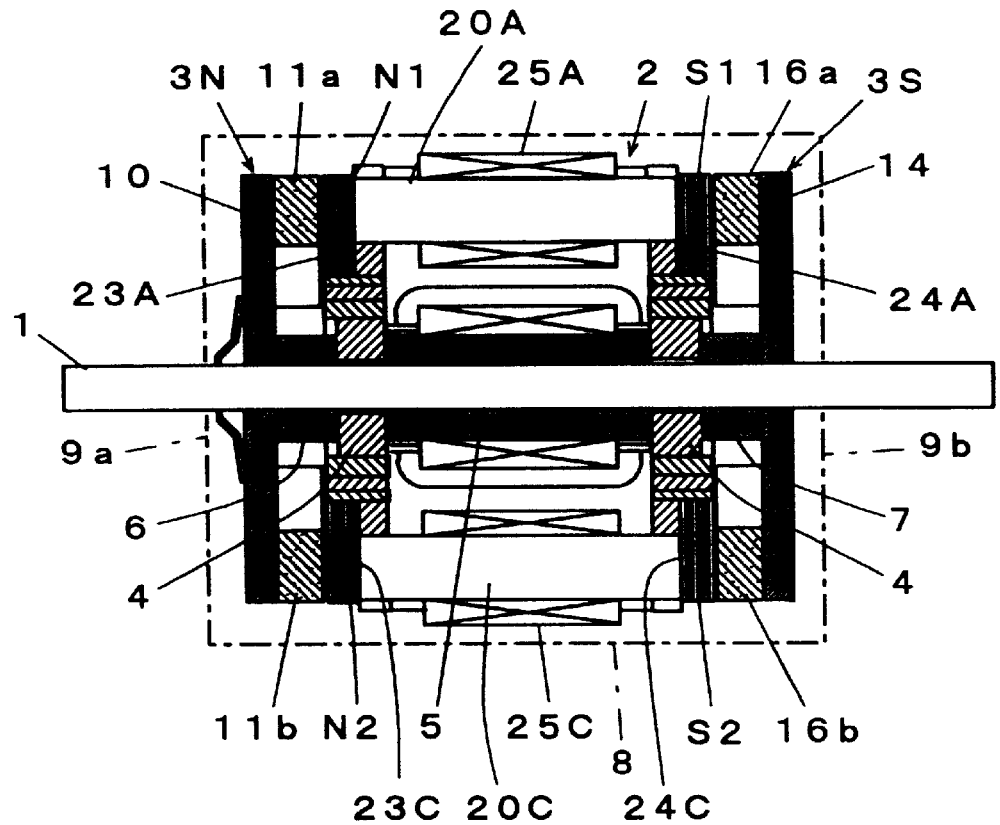
FIG. 3 a cross-sectional view taken along the line I—I shown in FIG. 2.

FIG. 1 through FIG. 3 respectively designate structure of a generator representing an embodiment of the present invention. FIG. 1 and FIG. 2 respectively shown an external appearance of the generator, whereas FIG. 3 shown an structure of the generator.

The generator exemplified therein comprises a rotary shaft 1, a stator 2 disposed surrounding external periphery of the shaft 1 and a pair of rotors 3N and 3S integrally secured to the shaft 1 at both side positions of the stator 2.

The stator 2 supports the shaft 1 via a pair of bearings 4 and 4. A spacer 5 for providing space between the bearings 4 and 4 is set inside of the stator 2, whereas spacers 6 and 7 for providing air gaps are respectively inserted onto the shaft 1 between the stator 2 and the rotors 3N/3S.

As shown in FIG. 3, the stator 2 and the rotors 3N/3S are respectively accommodated in a cylindrical case 8. Apertures at both ends of the cylindrical case 8 are respectively covered with plates 9a and 9b, and both ends of the shaft 1 externally project from the plates 9a and 9b.

Figure 4:
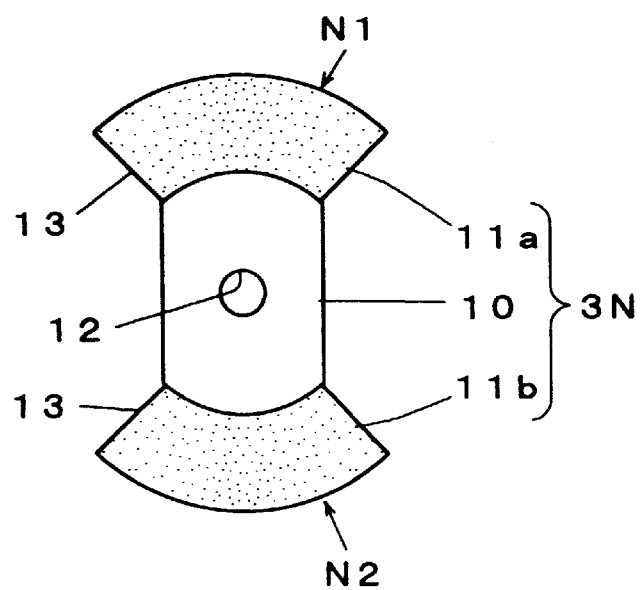
FIG. 4 is a lateral view of a rotor.

As shown in FIG. 4, the rotor 3N comprises a rotor piece 10 made from magnetic metallic material and a pair of permanent magnets 11a and 11b respectively being adhered to the piece 10.

Said rotor piece 10 comprises a shaft hole 12 for accommodating the shaft 1 therein formed in the center position thereof, and fan-shaped base portions 13 and 13 needed for adhesion of the magnets 11a and 11b thereto which are provided at diagonal positions of an external periphery of the rotor piece 10.

Said magnets 11a and 11b are formed in a fan-shape subtending substantially 90 degrees defining an external shape of the base portions 13 and 13. Outer flat surfaces of the magnets 11a and 11b are respectively formed into N-polar magnetic poles N1 and N2.

In the same way as the first rotor 3N, the second rotor 3S comprises a rotor piece 14 and a pair of permanent magnets 16a and 16b adhered to respective base portions on external peripheral surfaces of the piece 14, in which outer flat surfaces of the magnets 16a and 16b are respectively formed into S-polar magnetic poles S1 and S2.

The rotors 3N and 3S are integrally secured onto the rotary shaft 1 in order that the magnetic poles N1 and N2 of the rotor 3N can be opposed to the magnetic poles S1 and S2 of the rotor 3S across the stator 2.

Said stator 2 comprises 4 cores 20A~20D and a non-magnetic supporting frame 21 for supporting these cores 20A~20D equally spaced 90 degree apart.

Figure 5:
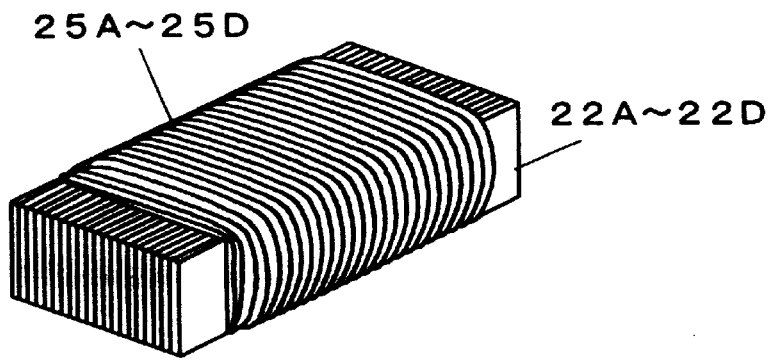
FIG. 5 is a perspective view of a coil portion of a core.

The cores 20A~20D are respectively comprise square-shaft-shaped coil portions 22A~22D composed of laminated rectangular silicon steel plates, and magnetic-pole portions 23A~23D and 24A~24D which are coupled on both end surfaces of the coil portions 22A~24D respectively. The magnetic-pole portions 23A~23D and 24A~24D are respectively formed via lamination of substantially 90-degree fan-shaped silicon steel plates. The coiled portions 22A~22D are respectively inserted in 4 slits 21a formed in external peripheral portions of the frame 21. As shown in FIG. 5, coils 25A~25D are wound in the axial peripheral direction on the external periphery of respective coiled portions 22A~22D.

Figure 6:
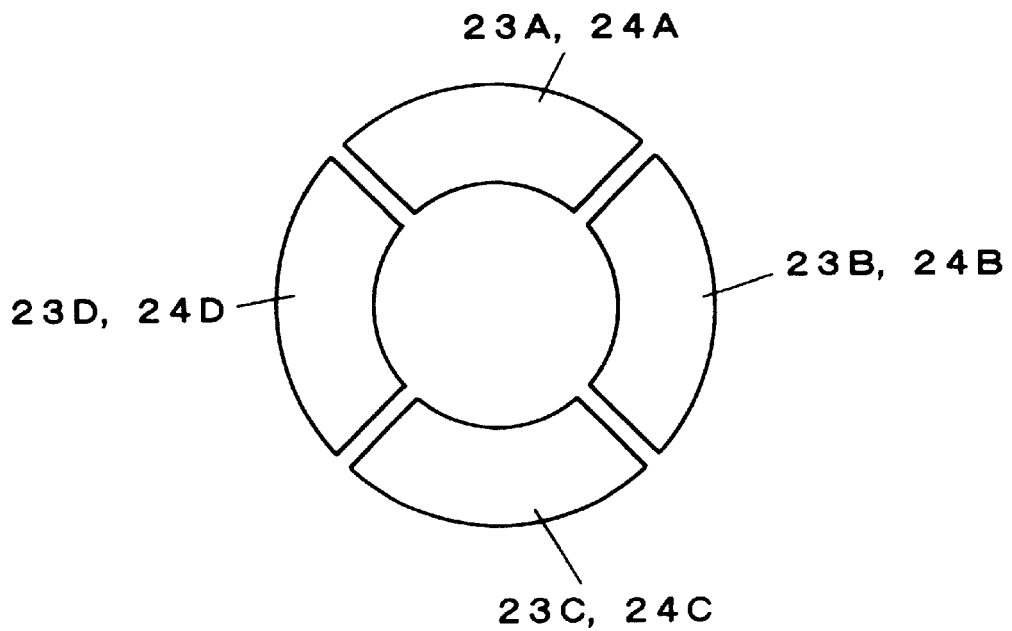
FIG. 6 is an illustration showing an arrangement of magnetic-pole portions of a stator.

As shown in FIG. 6, the magnetic-pole portions 23A~23D and 24A~24D at both ends of respective cores 20A~20D are formed into fan-shape a substantially similar to the shape of the magnets 11a and 11b of the rotor 3N and the magnets 16a and 16b of the rotor 3S. The magnetic-pole portions 23A~23D and 24A~24D are respectively disposed on the both-end surfaces of the frame 21. The magnetic-pole portions 23A~23D on one end are respectively opposed to the magnetic poles N1 and N2 of the rotor 3N across a minimal air-gap, whereas the magnetic-polar portions 24A~24D on other end are respectively opposed to the magnetic poles S1 and S2 of the rotor 3S across a minimal air-gap.

Winding direction of the coils 25A~25D is arranged to be as follows. If the coils 25A and 25C present at one of diagonal positions are subject to clockwise winding, then the coils 25B and 25D at the other diagonal position are subject to counter-clockwise winding.

Figure 7:
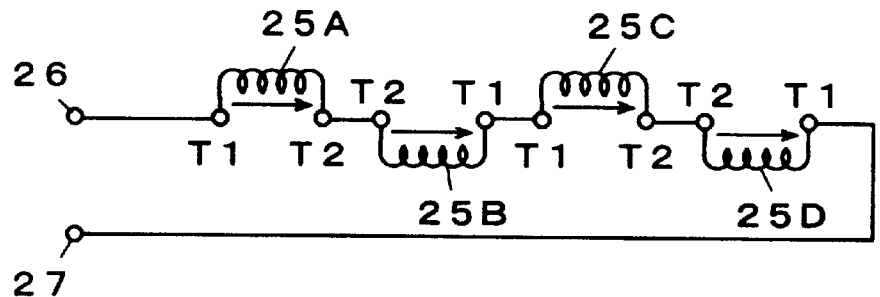
FIG. 7 a schematic showing a method of connecting coils.
Figure 7:
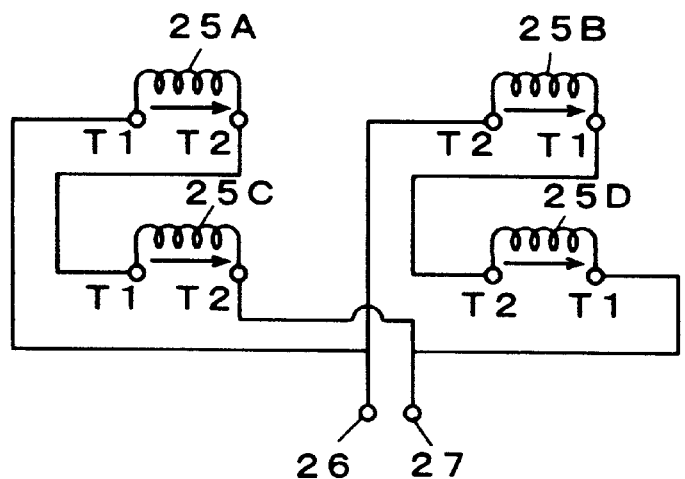
Figure 7:
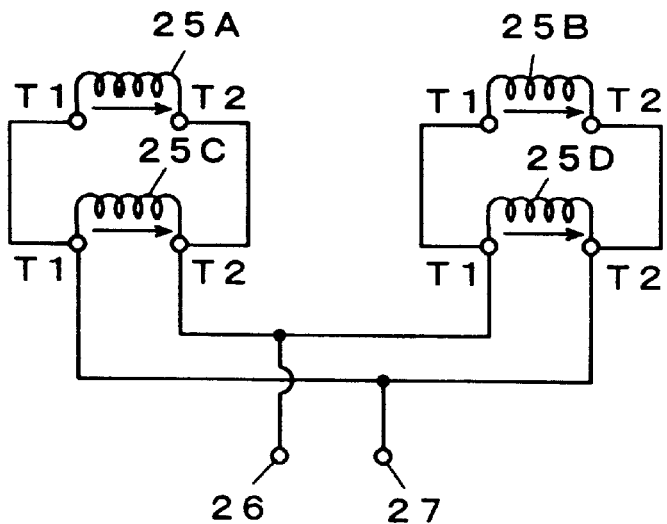

As shown in FIG. 7(1), the exemplified coils 25A~25D are connected to each other in series in order to add up the inductive electromotive forces from the coils and output the added inductive electromotive force. However, not only the serial connection suited for high-voltage output, but parallel connection suited for output of high current shown in FIG. 7(2) and serial-parallel connection via combination of the serial connection and the parallel connection shown in FIG. 7(3) may also be introduced.

The reference numerals T1 and T2 shown in FIG. 7 designate the initial point of winding of the coils 25A~25D, and the ending point of winding of these coils 25A~25D respectively, whereas the reference numerals 26 and 27 respectively designate output terminals.

Figure 8:
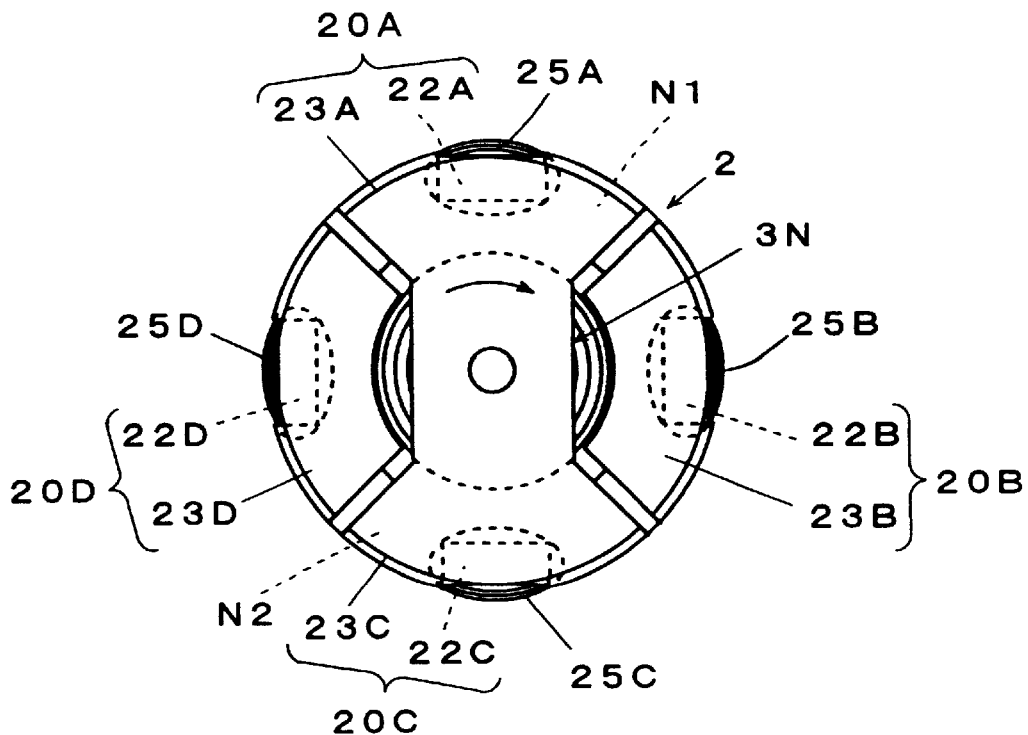
FIG. 8 is an illustration showing the principle of a generator.
Figure 14:
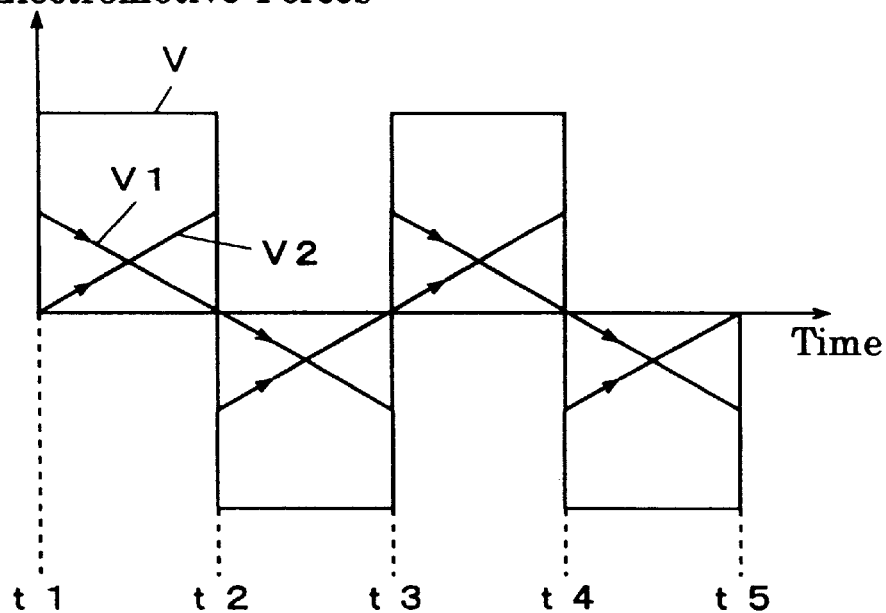
FIG. 14 is illustration showing inductive electromotive force of a coil.

FIG. 8 shows the principle of the generator based on the above-described structure. Referring now to FIG. 8 and FIG. 14, the principle of the operation of this generator is described below.

At the moment at which time-t1 shown in FIG. 14 is present, as shown in FIG. 8, the N-polar magnetic poles N1 and N2 of the rotor 3N are opposed to the magnetic-pole portions 23A and 23C at one of the diagonal positions of the stator 2. Whereas the S-polar magnetic poles S1 and S2 of the rotor 3S, although not being shown, are opposed to the magnetic-pole portions 24A and 24C at one of the diagonal positions of the stator 2.

When the above condition is present, as shown in FIG. 3, two magnetic paths are formed between the rotor 3N, 3S. A first path is from the magnetic pole N1 of the rotor 3N up to the magnetic pole S1 of the rotor S3 via the air-gap, the magnetic-pole portion 23A, the core 20A, the magnetic-pole portion 24A, and the other air-gap. A second path is from the magnetic pole N2 of the rotor 3N to the magnetic pole S2 of the rotor 3S via the air-gap, the magnetic-pole portion 23C, the core 20C, and the magnetic pole portion 24C. Magnetic flux flowing through the first path is in interlinkage state with the coil 25A wound on the core 20A, whereas magnetic flux flowing through the second path is in interlinkage state with the coil 25C wound on the core 20C.

When the shaft 1 is driven by rotating force, and the rotors 3N and 3S are integrally rotated with the shaft 1 in the direction shown by the arrow in FIG. 8, the magnetic poles N1 and N2 of the rotor 3N respectively depart from the magnetic-pole portions 23A and 23C of the stator 2, and the magnetic poles S1 and S2 of the rotor 3S also depart from the magnetic-pole portions 24A and 24C of the stator 2. Accordingly, the magnetic flux in interlinkage state with the coils 25A/25C gradually decreases to result in the generation of inductive electromotive force V1 for deterring the decrease of the magnetic flux in accordance with the right-handed screw rule. The inductive electromotive force V1 diminishes relative to the decrease of magnetic flux in interlinkage state.

On the other hand, as a result of the rotation of the rotors 3N and 3S, the magnetic poles N1 and N2 of the rotor 3N respectively approach the magnetic-pole portions 23B and 23D of the stator 2, whereas the magnetic poles S1 and S2 of the rotor 3S respectively approach the magnetic-pole portions 24B and 24D. This in turn causes the magnetic flux in interlinkage state with the coils 25B/25D to be increased to result in the generation of inductive electromotive force V2 for deterring the increase of the magnetic flux in accordance with the right-handed screw rule. The inductive electromotive force V2 grows relative to the increase of the magnetic flux in interlinkage state.

The time t2 shown in FIG. 14 represents the moment at which the rotors 3N and 3S have respectively rotated themselves by 90 degrees. The magnetic poles N1 and N2 of the rotor 3N are opposed to the magnetic-pole portions 23B and 23D of the stator 2, whereas the magnetic poles S1 and S2 of the other rotor 3S are opposed to the magnetic-pole portions 24B and 24D of the stator 2. When the above condition is present, inductive electromotive force V1 of the coils 25A and 25C is reduced to zero, whereas inductive electromotive force V2 of the coils 25B and 25D is maximized.

The times t3, t4, and t5 shown in FIG. 14 respectively represent the moments at which rotative angles of the rotors 3N and 3S have respectively reached 180 degrees, 270 degrees, and 360 degrees. The principle of generation of inductive electromotive force V1 and V2 from the time t2 on is identical to that which has been described above, and thus, description related thereto is omitted.

The inductive electromotive forces V1 and V2 generated in the coils 25A~25D are varied as sawtooth shaped waves in correspondence with rotation of the rotors 3N and 3S. Rectangular output, produced power V by synthesizing the inductive electromotive force V1 and V2 generated in the coils 25A~25D, is eventually output from terminals 26 and 27.

Figure 9:
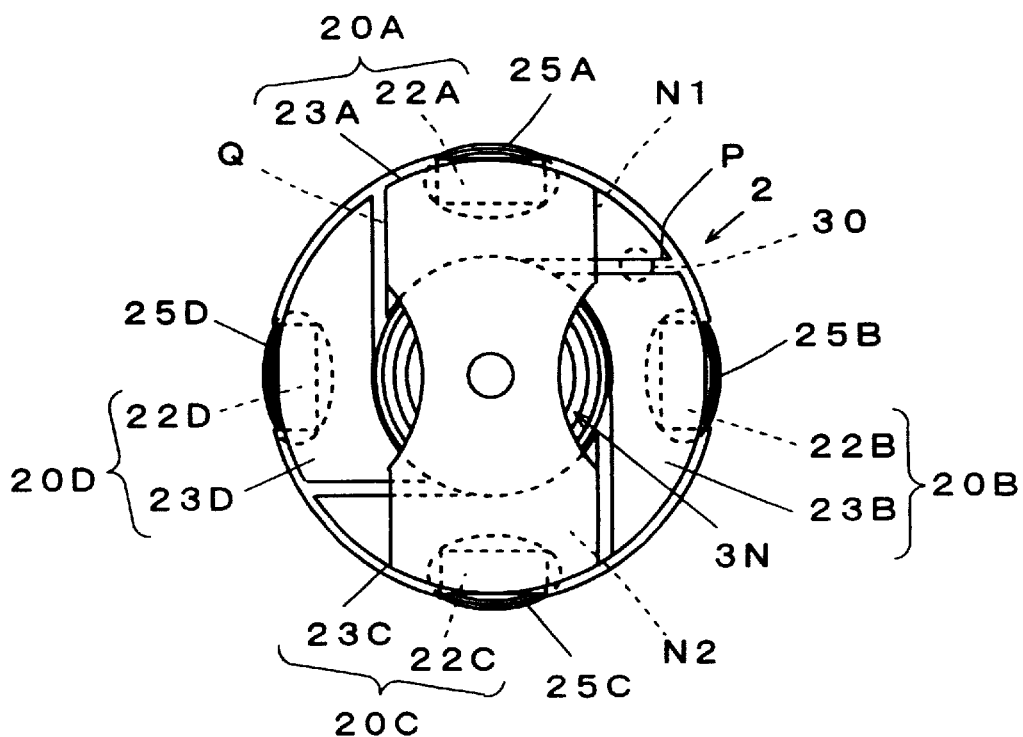
FIG. 9 is an illustration showing the principle of a motor.

The generator according to the above embodiment is usable as an electric motor. FIG. 9 exemplifies the structure and principle of the motor.

The motor exemplified in FIG. 9 differs from the above-described generator in the shape of the magnetic poles N1, N2, S1, and S2 provided for the rotors 3N and 3S and also the shape of the magnetic-pole portions 23A~23D and 24A~24D provided for the stator 2. In addition, the exemplified motor is different from the above generator in that a sensor 30 is disposed near the rotor 3N. Except for this arrangement, other structural details of the motor are identical to that of the above generator, and thus, by way of referring to corresponding structures via identical reference numerals, detailed description thereof is omitted.

As shown in FIG. 9, the magnetic poles N1, N2, S1, and S2 provided for the rotors 3N and 3S are symmetrical with respect to the center line thereof, with shapes of above and below ends being similarly-shaped and edges being formed in parallel with each other. Conversely, as regards the stator 2, each of the respective magnetic pole portions 23A~23D and 24A~24D is so formed that both ends of the portion take different shapes, in order that distribution of magnetic flux can be effected asymmetrically with respect to the center line thereof, thus enabling the stator 2 to effect self-activation at the start-up moment.

The magnetic-pole portions 23A~23D and 24A~24D shown in FIG. 9 are respectively formed in order that one end-edge P and the other end-edge Q are on rectangular directions. However, so far as magnetic flux can be distributed asymmetrically with respect to the center line, the other forms except FIG. 9 can be accepted.

In order to detect rotational angular positions of the rotors 3N and 3S, the sensor 30 is disposed at the boundary position between the magnetic-pole portions 23A and 23B of the stator 2 and nearby the rotor 3N. A magnetic sensor is used for the sensor 30, however, a photoelectric sensor or a proximity switch may also be used. Furthermore the present embodiment shown in FIG. 9 detects the rotational angular positions of the rotors 3N and 3S using a single unit of the sensor 30, but it is also permissible for this embodiment to use a plurality of position-detecting sensors.

Figure 10:
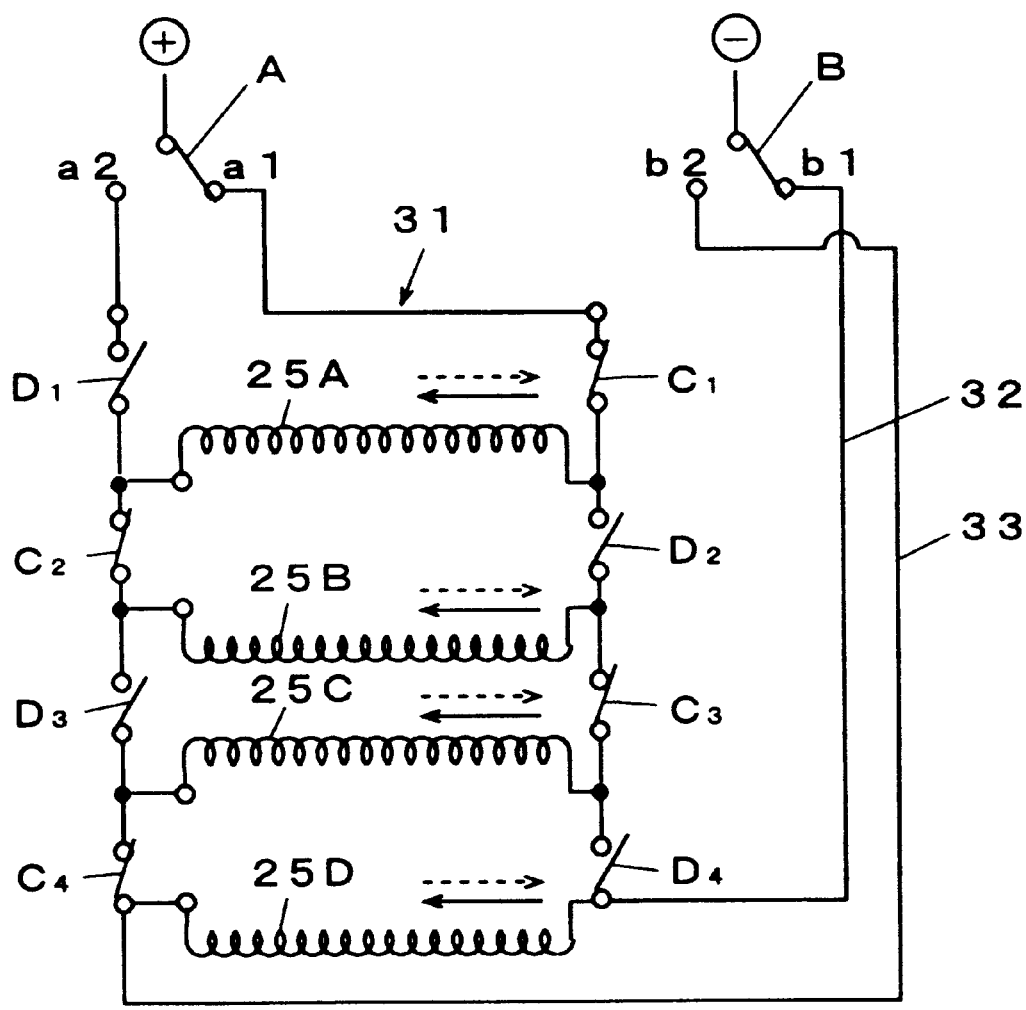
FIG. 10 is a schematic diagram showing structure of a drive-control circuit.

FIG. 10 shows the structure of a drive control circuit 31 for driving the motor by properly feeding current to the said coils 25A~25D of the stator 2.

The reference characters A and B shown in FIG. 10 respectively designate change-over switches, each having a pair of circuit-changing contacts a1/a2 and b1/b2, whereas C1~C4 and D1~D4 respectively designate keying switches.

The change-over switches A and B and the keying switches C1~C4 and D1~D4 respectively execute switching operation and keying operation in linkage with each other. Concretely, when the switches A and B respectively lead to the contacts a1/b1 to cause the switches C1~C4 to be closed and the switches D1~D4 to be open, the first power-feeding circuit 32 becomes conductive to feed current to the coils 25A~25D in the direction shown by the solid line arrow.

Whereas the switches A and B respectively lead to the contacts a2/b2 to cause the switches D1~D4 to be closed and the switches C1~C4 to be open, the second power-feeding circuit 33 becomes conductive to feed current to the coils 25A~25D in the direction shown by the dotted line arrow.

Said change-over switches A and B and the key switches C1~C4 and D1~D4 respectively execute circuit-changing operation and keying operation based on a position-detect signal output from the sensor 30. When executing a concrete embodiment, the switches A, B, C1~C4, and D1~D4 are respectively in the form of semiconductor switches such as a transistor for example.

When power is fed to the coils 25A~25D, the magnetic-pole portions 23A~23D and 24A~24D at both ends of the cores 20A~20D wound with the coils 25A~25D are respectively magnetized into either of the polarities N and S.

Assume that the magnetic-pole portion 23A among the magnetic-pole portions 23A~23D on the side of the rotor 3N is magnetized into polarity N for example, the following magnetic-pole portion 23B is magnetized into polaity S, and then the following magnetic-pole portion 23C is magnetized into polarity N to cause the following magnetic-pole portion 23D to be magnetized into polarity S. When the magnetic-pole portion 23A has been magnetized into polarity N, the magnetic-pole portion 24A among the magnetic-pole portions 24A~24D on the side of the rotor 3S is magnetized into polaity S to cause the following magnetic-pole portion 24B to be magnetized into polarity N, the following magnetic-pole portion 24C to be magnetized into polarity S, and the following magnetic-pole portion 24D to be magnetized into polarity N. Whenever the switches A, B, C1~C4 and D1~D4 are respectively operated, direction of feeding power to the coils 25A~25D is reversed, and thus, polarities of the magnetic-pole portions 23A~23D and 24A~24D are respectively reversed.

Figure 11:
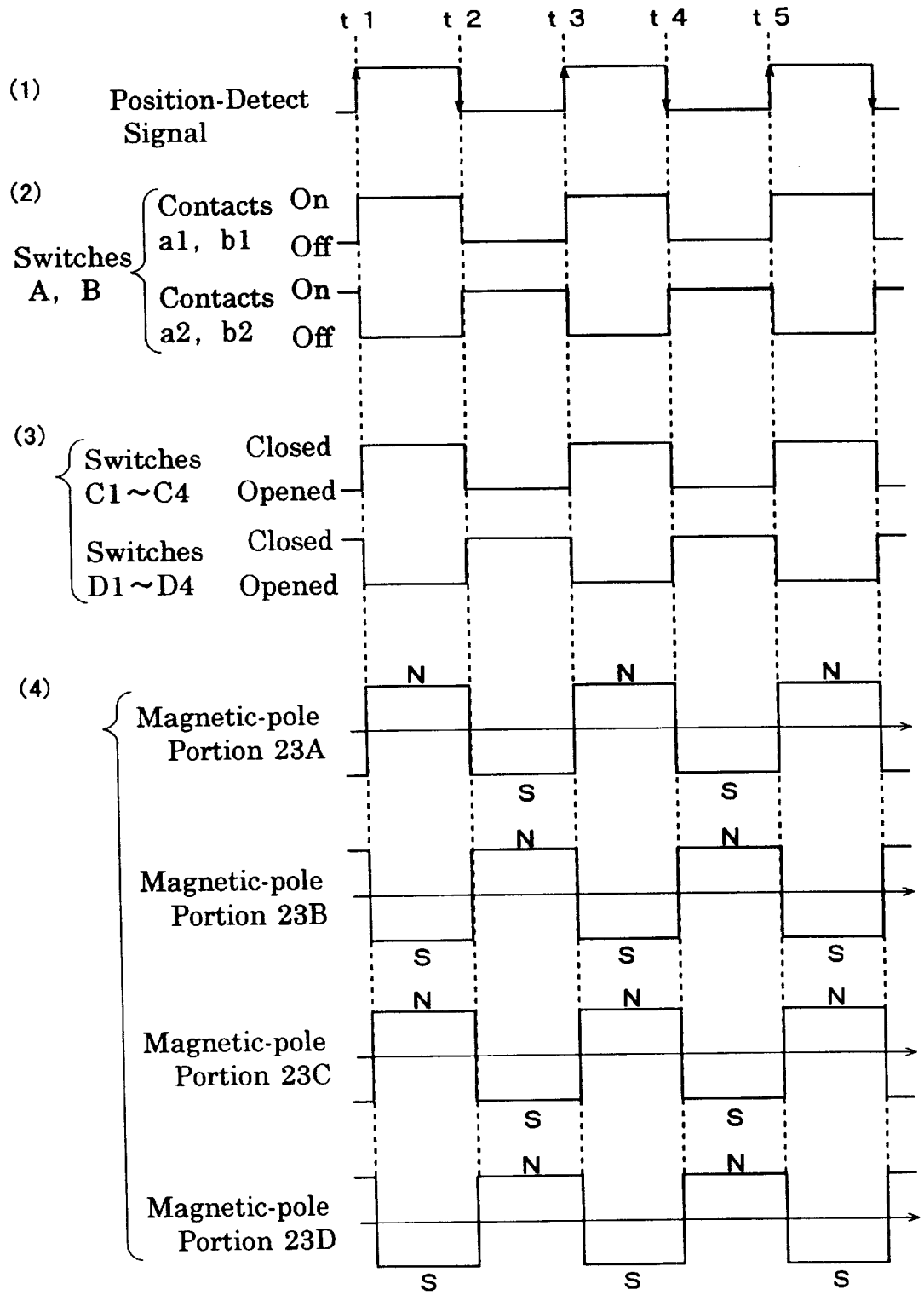
FIG. 11 is a time-chart representing operation of a motor.
Figure 12:
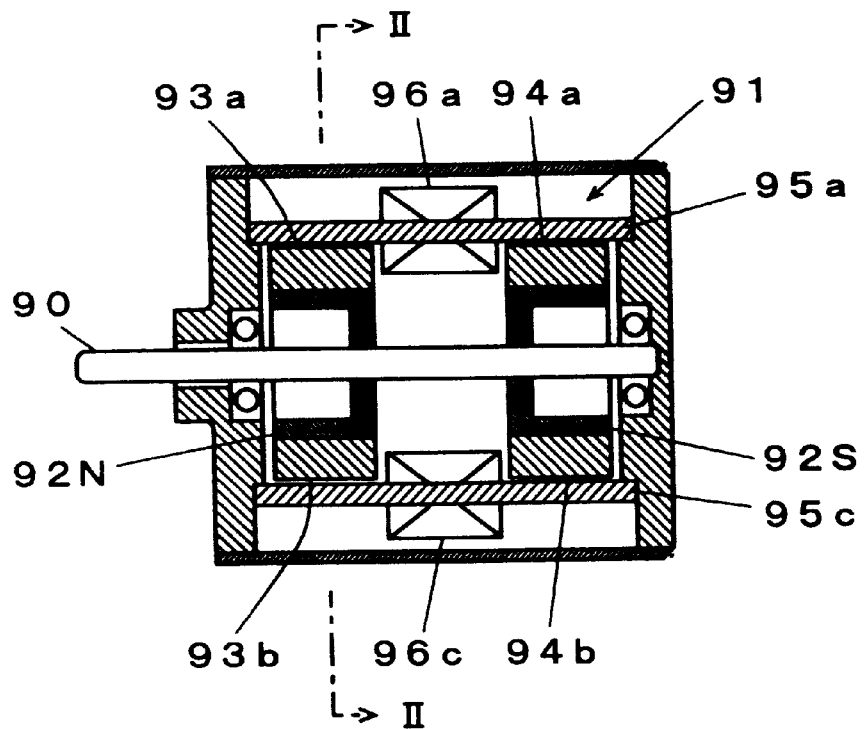
FIG. 12 is a cross-sectional view showing structure of a conventional motor.
Figure 13:
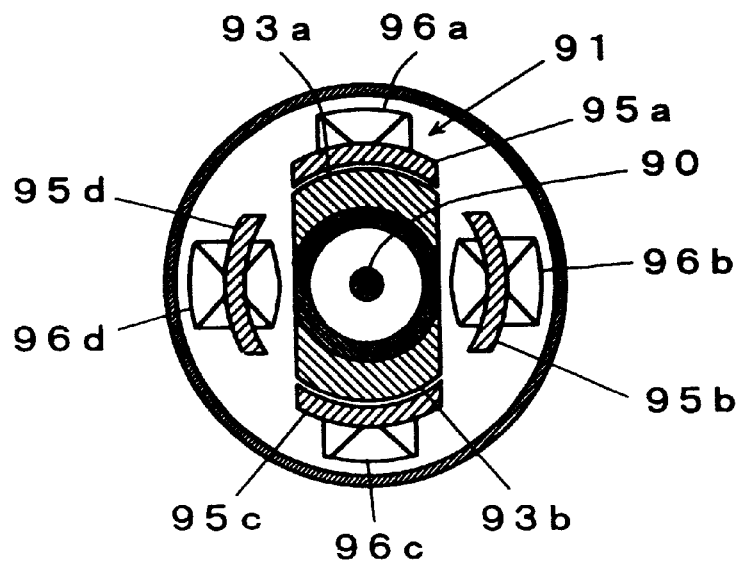
FIG. 13 is a cross-sectional view taken along the line II—II shown in FIG. 12.

FIG. 11 represents a time-chart designating principle of the operation of the above-described motor. Referring now to FIG. 9~FIG. 11, operation of the motor is described below.

As shown in FIG. 9, at the time t1 shown in FIG. 11, the N-polar magnetic poles N1 and N2 of the rotor 3N are respectively opposed to the magnetic-pole portions 23A and 23C of the stator 2, whereas the S-polar magnetic poles S1 and S2 are respectively opposed to the magnetic-pole portions 24A and 24C.

When the above condition is present, the sensor 30 is sensitized by the magnetic pole N1 of the first rotor 3N to cause a position-detect signal to rise up as shown in FIG. 11(1). In response to the rise of the signal, the change-over switches A and B respectively operate and lead to the contacts a1 and b1 as shown in FIG. 11(2). Simultaneously, the switches C1~C4 are closed to cause the switches D1~D4 to be opened, as shown in FIG. 11(3), to cause the first power-feeding circuit 32 to become conductive to enable the coils 25A~25D to receive power. Accordingly, the magnetic-pole portion 23A of the rotor 3N is magnetized into polarity N to cause the magnetic-pole portion 23B to be magnetized into polarity S, the magnetic portion 23C to be magnetized into polarity N, and the magnetic-pole portion 23D to be magnetized into polarity S as shown in FIG. 11(4). Although there is no illustration on the magnetic-pole portions 24A~24D of the rotor 3S, it should be understood that the magnetic-pole portion 24A is magnetized into polarity S, the magnetic-pole portion 24B is magnetized into polarity N, the magnetic-pole portion 24C is magnetized into polarity S, and the magnetic-pole portion 24D is magnetized into polarity N, respectively.

As a result of the above operation alternately magnetizing the magnetic-pole portions 23A~23D and 24A~24D of the stator 2 into polarities N and S, on the part of the first rotor 3N, repulsive force is generated between the N-polar magnetic poles N1/N2 and the magnetic-pole portions 23A/23C magnetized into polarity N, and in addition, attractive force is generated between the N-polar magnetic poles N1/N2 and the magnetic-pole portions 23B and 23D magnetized into polarity S. Likewise, on the part of the second rotor 3S, repulsive force is generated between the S-polar magnetic poles S1/S2 and the magnetic-pole portions 24A and 24C magnetized into polarity S, and in addition, attractive force is generated between the S-polar magnetic poles S1/S2 and the magnetic-pole portions 24B and 24D magnetized into polarity N. Because of the effect of electromagnetic force, both rotors 3N and 3S are respectively rotated.

Time t2 shown in FIG. 11(1) designates the moment at which the rotors 3N and 3S have respectively turned themselves by 90 degrees. The magnetic poles N1 and N2 of the rotor 3N are opposed to the magnetic-pole portions 23B and 23D of the stator 2, whereas the magnetic poles S1 and S2 of the rotor 3S are respectively opposed to the magnetic-pole portions 24B and 24D of the stator 2.

When the time t2 has been reached, the sensor 30 is no longer sensitive to the magnetic pole N1 of the first rotor 3N to cause the position-detect signal to fall as shown in FIG. 11(1). In response to the fall of the position-detect signal, the switches A and B respectively operate and lead to the contacts a2 and b2 as shown in FIG. 11(2) to cause the switches D1~D4 to be closed and the switches C1~C4 to be opened simultaneously as shown in FIG. 11(3). This in turn causes the second power-feeding circuit 33 to become conductive to cause power to flow through the coils 25A~25D in the inverse direction. Consequently, the magnetic-pole portion 23A of the rotor 3N is magnetized into polarity S to cause the magnetic-pole portion 23B to be magnetized into polarity N, the magnetic-pole portion 23C to be magnetized into polarity S, and the magnetic-pole portion 23D to be magnetized into polarity N as shown in FIG. 11(4). While there is no illustration of the magnetic-pole portions 24A~24D of the rotor 3S, it should be understood that the magnetic-pole portion 24A is magnetized into polarity N, the magnetic-pole portion 24B is magnetized into polarity S, the magnetic-pole portion 24C is magnetized into polarity N, and the magnetic-pole portion 24D is magnetized into polarity S.

As described above, the polarities of the magnetic-pole portions 23A~23D and 24A~24D of the stator 2 are respectively reversed from N to S, or S to N. Accordingly, on the part of the rotor 3N, repulsive force is generated between the N-polar magnetic poles N1/N2 and the magnetic-pole portions 23B/23D being magnetized into polarity N, whereas attractive force is generated between the N-polar magnetic poles N1/N2 and the magnetic-pole portions 23A/23C magnetized into polarity S. On the part of the rotor 3S, repulsive force is generated between the S-polar magnetic poles S1/S2 and the magnetic-pole portions 24B/24D magnetized into polarity S, whereas attractive force is generated between the S-polar magnetic poles S1/S2 and the magnetic-pole portions 24A/24C magnetized into polarity N. Because of the effect of electromagnetic force, the rotors 3N and 3S are respectively subject to continuous rotation.

Times t3, t4, and, shown in FIG. 11, respectively designate the moment at which the rotors 3N and 3S have respectively rotated themselves by 180 degrees, 270 degrees, and 360 degrees. The principle of the generation of rotating force from time t2 on is identical to that which is described above, and thus, description related thereto is omitted.

Therefore, by feeding power to the coils 25A~25D with switching the direction of current by turns, electromagnetic force continuously acts on the rotors 3N and 3S to enable the shaft 1 to continue rotation.

In the above-described embodiments, each of the rotors 3N and 3S is provided with a pair of magnetic poles, whereas the stator 2 is provided with 4 of the cores. It should be understood however that the number of magnetic poles of each of the rotors 3N and 3S may also be increased to 3 or 4 or more and are not limited to a pair of them. In this case, the stator 2 should be provided with a certain number of cores that corresponds to double number of the magnetic poles.

As has fully been described above, by way of disposing a pair of rotors 3N and 3S at both sides of the stator 2 and arranging the magnetic-poles N1/N2 of the rotor 3N and S1/S2 of the rotor 3S to be oppossed to respective magnetic-pole portions 23A~23D and 24A~24D of the cores of the stator 2 in the axial direction, the magnetic poles N1/N2 of the rotor 3N and S1/S2 of the rotor 3S can be formed with flat surfaces to easily even out magnetic flux. Further, inasmuch as the stator 2 can be contracted in the axial direction, a total length of the magnetic path is also contracted to result in decreased iron loss and leakage flux.

By virtue of the above structural advantage, the invention has made it possible to easily manufacture a compact rotary electric apparatus incorporating improved operating characteristic. By way of applying the rotary electric apparatus to a generator, stable output power without distortion of inductive electromotive force per coil can be secured. Further, by way of utilizing the inventive rotary electric apparatus for a motor, a compact motor enabling smooth rotation of rotors can be offered for use.

What is claimed is:

1. A rotary electric apparatus comprising:

a rotary shaft defining an axial direction;

a stator disposed around an external periphery of said rotary shaft and having coil assemblies including coils wound around core members extending parallel to said axial direction and equidistantly disposed about said rotary shaft, said core members having opposing first and second stator pole surfaces normal to said axial direction and disposed respectively in opposing first and second sides of said stator;

said stator including a support frame rotatably supporting said rotary shaft;

a first monopole rotor fixed on said rotary shaft adjacent said first side of said stator, said first monopole rotor having all N-polar magnetic pole surfaces normal to said axial direction, disposed diametrically opposed about said rotary shaft, and alignable opposite said first stator pole surfaces during rotation of said first monopole rotor;

a second monopole rotor fixed on said rotary shaft adjacent said second side of said stator, said second monopole rotor having all S-polar magnetic pole surfaces normal to said axial direction, disposed diametrically opposed about said rotary shaft, and alignable opposite said second stator pole surfaces during rotation of said second monopole rotor, said S-polar magnetic pole surfaces being aligned opposing said N-polar magnetic pole surfaces in the axial direction with said stator therebetween; and said stator having a number of said core members which is twice a number of each of said S-polar magnetic pole surfaces and said N-polar magnetic pole surfaces.

2. The rotary electric apparatus according to claim 1, further comprising interconnection means for interconnecting said coils of said stator to generate sawtooth shaped inductive electromotive forces by rotation of said first and second monopole rotors when said rotary shaft is driven by rotating force such that said sawtooth shaped inductive electromotive forces are synthesized for external delivery as generated output.

3. The rotary electric apparatus according to claim 1, further comprising means for applying current to said coils which alternates in direction such that said rotary shaft is rotated by repulsive forces and attractive forces which are simultaneously generated between said first and second stator pole surfaces of said cores and respective ones of said N-polar magnetic pole surfaces and said S-polar magnetic pole surfaces to thereby function as a motor.

4. The rotary electric apparatus according to claim 3, wherein said stator pole surfaces are asymmetrically shaped with respect to center lines of said core members to cause magnetic flux to distribute asymmetrically with respect to said center lines to generate an initiating force.

5. The rotary electric apparatus of claim 1 wherein said support frame include bearings rotatably supporting said rotary shaft which are disposed between said first and second monopole rotors.

\* \* \* \* \*